United States Patent [19]
Murray

[11] Patent Number: 4,615,157
[45] Date of Patent: Oct. 7, 1986

[54] FLOOR JOIST DAMPER

[75] Inventor: Thomas M. Murray, Norman, Okla.

[73] Assignee: Nucor Corporation, Charlotte, N.C.

[21] Appl. No.: 673,614

[22] Filed: Nov. 21, 1984

[51] Int. Cl.⁴ .............................................. E04B 1/98
[52] U.S. Cl. ...................................... 52/167; 52/393; 52/283; 52/693
[58] Field of Search ................. 52/283, 167, 721, 693, 52/393, 126.5; 248/569; 403/388, 393, 408, 4

[56] References Cited

U.S. PATENT DOCUMENTS

| | | | |
|---|---|---|---|
| 974,225 | 11/1910 | Allen | 52/721 |
| 1,369,340 | 2/1921 | Hutchinson | 52/693 |
| 1,599,692 | 9/1926 | Trout | 52/646 |
| 1,863,817 | 6/1932 | Wells | 52/721 |
| 2,055,000 | 9/1936 | Bacigalupo | 52/167 |
| 3,145,012 | 8/1964 | Kfoury | 248/569 |
| 3,200,950 | 8/1965 | Gruner | 248/569 |
| 3,511,001 | 5/1970 | Morgan | 52/126.5 |
| 3,513,610 | 5/1970 | Devonport | 52/283 |
| 3,691,712 | 9/1972 | Bowling et al. | 52/393 |
| 3,793,790 | 3/1974 | Love et al. | 52/693 |
| 3,856,242 | 12/1974 | Cook | 52/167 |
| 3,906,689 | 9/1975 | Nakayama | 52/167 |
| 4,040,590 | 8/1977 | Baratoff | 248/569 |
| 4,041,659 | 8/1977 | McElhoe | 52/93 |

Primary Examiner—James L. Ridgill, Jr.
Attorney, Agent, or Firm—Shenier & O'Connor

[57] ABSTRACT

A damping building structure, in the form of a floor joist, spanning two separated supports. Oscillations in the joist are damped by a pair of overlapping plates which are clamped together by one or more nuts and bolts. One of the plates is secured to the floor joist being damped, and the other of the plates is secured, directly or indirectly, to ground. The friction between the overlapping plates acts to damp any oscillations in the floor joist. A spring may be interposed between one of the plates and the nut or bolthead, and, if desired, a friction material may be sandwiched between the plates. The damping arrangement may be secured to the floor joist at one end, at both ends, or at mid-point of the span between the two supports.

13 Claims, 8 Drawing Figures 4,615,157

FLOOR JOIST DAMPER

BACKGROUND OF THE INVENTION

In many buildings, especially those that are prefabricated, joists are used instead of I-beams. However, while joists are lighter and cheaper than solid beams, they are more flexible. When they are used to support floors which are intended to bear machines or heavy objects, vibrations or oscillations are set up when the machines are operated or the heavy objects are moved over the floors. Furthermore, building structures are subjected to natural forces such as wind, earth tremors caused by passing traffic, or the like. Various methods have been proposed to meet the problem of vibrations. I have discovered a simple and extremely efficient means of using comparatively light joists extending over relatively long spans and preventing damage and annoyance caused by vibrations by damping them.

FIELD OF THE INVENTION

My invention relates to the frictional damping of vibrations in joists employed in building structures.

DESCRIPTION OF THE PRIOR ART

U.S. Pat. No. 2,055,000 to Bacigalupo discloses a building construction in which the entire building is carried on resilient members mounted on an antifriction support. This leads the art away from the instant invention.

U.S. Pat. No. 3,145,012 to Kfoury shows an all-directional frictional damper to be used as an instrument platform or machine base. There is no teaching of the combination of a frictional damper for joists.

U.S. Pat. No. 3,200,950 to Gruner discloses a frictional damping arrangement for a laundry machine and, more particularly, for a washer-extractor. There is no disclosure of the combination of the instant invention relating to a building joist.

U.S. Pat. No. 3,511,001 to Morgan, Jr. shows a resilient leveling means for floors, in which the length of leveling screws passing through modified U-shaped springs may be adjusted to ensure that the floor to which they are attached may be easily leveled. There is no disclosure of a frictional damper for joists.

U.S. Pat. No. 3,691,712 to Bowling et al recognizes the problem, but presents a different solution—namely, the use of a viscoelastic linkage to an open-web joist to damp vibrations. The patentees point out that the damping occurs by converting mechanical energy to heat by means of the strain in the viscoelastic linkage. The viscoelastic materials are elastomeric rubbers which may be filled with graphite, micas, asbestos, talc, and flaked metals There is no teaching of the instant invention, in which a novel construction using frictional damping is employed.

U.S. Pat. No. 4,040,590 to Baratoff discloses a damping assembly adapted to isolate floor or other supports for equipment mounted therein. There is no disclosure of damping a joist per se. This patent is directed solely to isolating friction generated by equipment from the floor or other structure on which it is mounted, so that the vibrations from the equipment will not be transmitted to the floor. There is no disclosure of preventing the vibrations in floor joists which support the floor.

SUMMARY OF THE INVENTION

My invention contemplates attaching an extension to the bottom chord of a joist. This extension forms a gap with the steel column or masonry wall which supports the joist. The gap is bridged by a pair of metal plates. One plate is attached to the steel column or masonry wall, and the other plate is attached to the bottom chord extension. The plates overlap, and the overlapping portions are allowed to contact each other directly or by an interposed friction material sandwiched between the plates The friction material is clamped between the plates by adjustable means such as a threaded bolt and nut. A spring washer may advantageously be interposed between the nut or bolthead and one of the plates. In one form of my invention, the vibration damper may be interposed between the bottom chord and a column supported by the floor or other structural support. It is to be understood that a vibration damper may be used at each end of the joist or, if desired, at each end of the joist and intermediate the ends.

OBJECTS OF THE INVENTION

One object of my invention is to provide a simple, inexpensive, and efficient vibration damper for floor joists.

Another object of my invention is to provide a floor joist, adapted to be used in a building structure, which will damp oscillation in the floor joist from being transmitted to the supports for the joist and causing damage to the building structure.

Still another object of my invention is to provide an assembly for damping floor joists which is economical to produce.

A further object of my invention is to provide a combination of a floor joist and damping means, effective for use with various sizes and spans of joists.

Other and further objects of my invention will appear from the following description.

BRIEF DESCRIPTION OF THE DRAWINGS

In the accompanying drawings, which form part of the instant specification and which are to be read in conjunction therewith, and in which like reference numerals are used to indicate like parts in the various views.

DESCRIPTION OF THE PREFERRED EMBODIMENT

Figure 1:
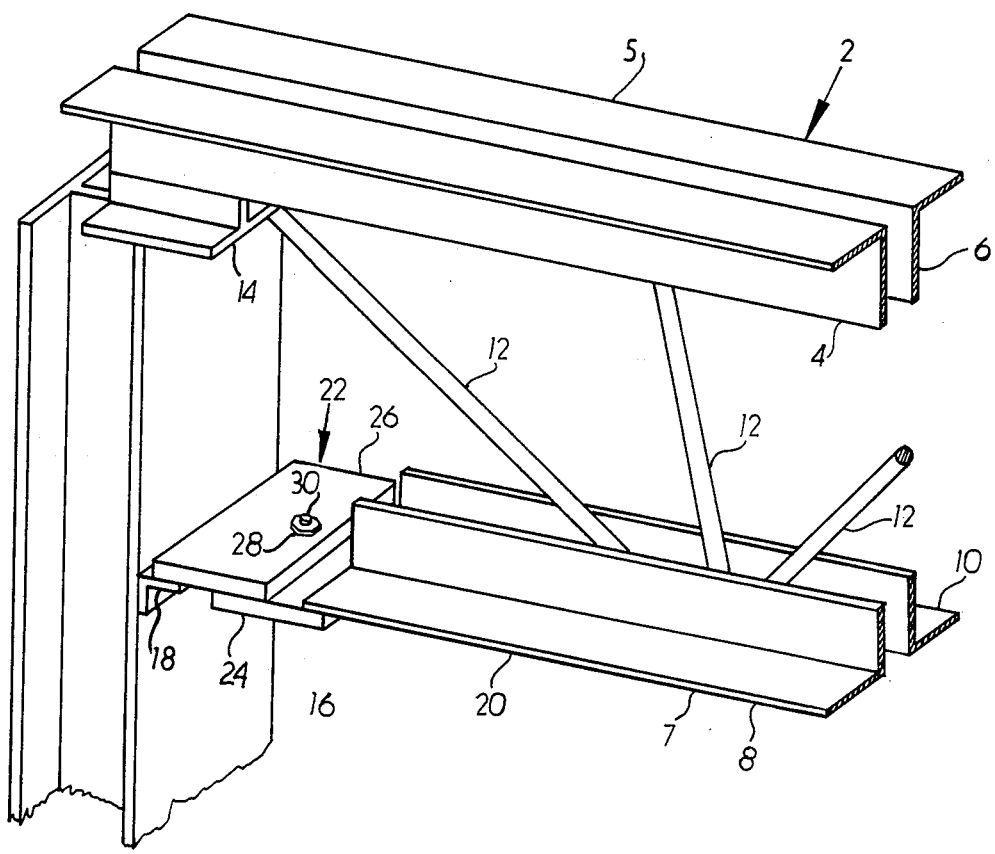
FIG. 1 is a fragmentary perspective view, with parts in section, of an assembly showing the end of a joist supported by a steel column, with a friction damper of my invention positioned between the support column and the bottom chord extension of the joist.

Referring to FIG. 1, in a joist girder indicated generally by the reference numeral 2, a pair of structural angle members 4 and 6 form the upper chord 5 of the joist. A pair of lower structural angle members 8 and 10 form the lower chord of the joist. Brace members 12 extend between the upper and lower chords to complete the joist. These are positioned, respectively, between upper angle members 4 and 6 and lower angle members 8 and 10. The welding of the upper angle members 4 and 6 to the brace members 12 forms a T-shaped upper chord 5; while the welding of the lower angle members 8 and 10 to the brace members 12 forms a T-shaped lower chord 7. I weld a T-clip 14 to the upper chord for supporting the joist 2 on a steel column 16, or a masonry wall, or the like. An angle clip 18 is welded to the steel column 16. A bottom chord extension 20 forms a gap between its end and the supporting column 16. A vibration damper, indicated generally by the reference numeral 22, bridges the gap between the bottom chord extension 20 and the steel column 16. This gap is filled by the friction damper, which is composed of a bottom plate 24 welded to the bottom chord extension 20 and an upper plate 26 welded to the angle clip 18. The plates 24 and 26 are clamped together by a nut 28 screwed upon a bolt 30. As vibrations occur in the joist, movement by the bowing or arching of the joist is rapidly damped in a simple, convenient, and expeditious manner by the friction generated between plates 24 and 26.

Figure 2:
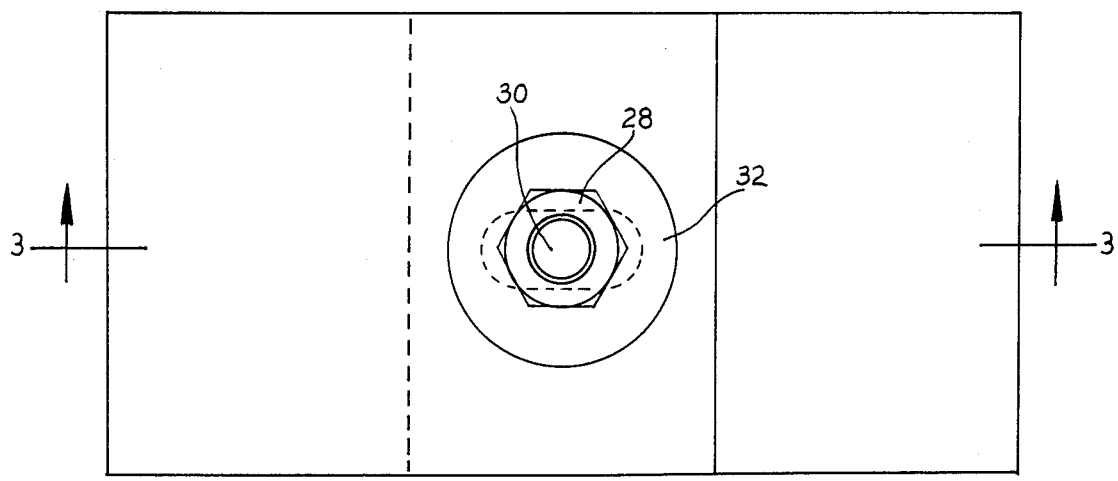
FIG. 2 is a top plan view of a friction damper of my invention.

A plan view of the damper shown in FIG. 1 appears in FIG. 2. The bottom plate 24 is clamped to the top plate 26 by means of the nut 28 threaded upon the bolt 30. A spring washer 32 is interposed between the nut 28 and the top plate 26.

Figure 3:
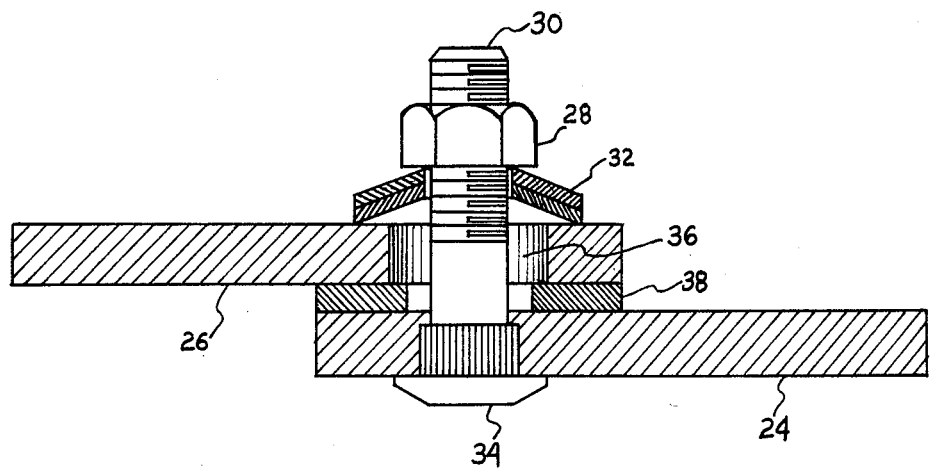
FIG. 3 is a sectional view taken along the line 3—3 of FIG. 2.

Referring now to FIG. 3, the bolt 30 is formed with a bolthead 34 which engages the bottom of the bottom plate 24. The spring washer 32 may be formed of a single conically shaped member or a pair of them. A slot 36 is formed in the upper plate 26 to permit relative movement between the upper plate 26 and the lower plate 24 of my friction damper. While I prefer metal-to-metal contact between the upper and lower plates of my friction damper, I may sandwich a friction material 38 between the plates. This material may be brake lining, wood such as lignum vitae or hard maple, leather, or the like. It is to be understood that my damper assembly may be used at each end of the joist girder 2.

Figure 4:
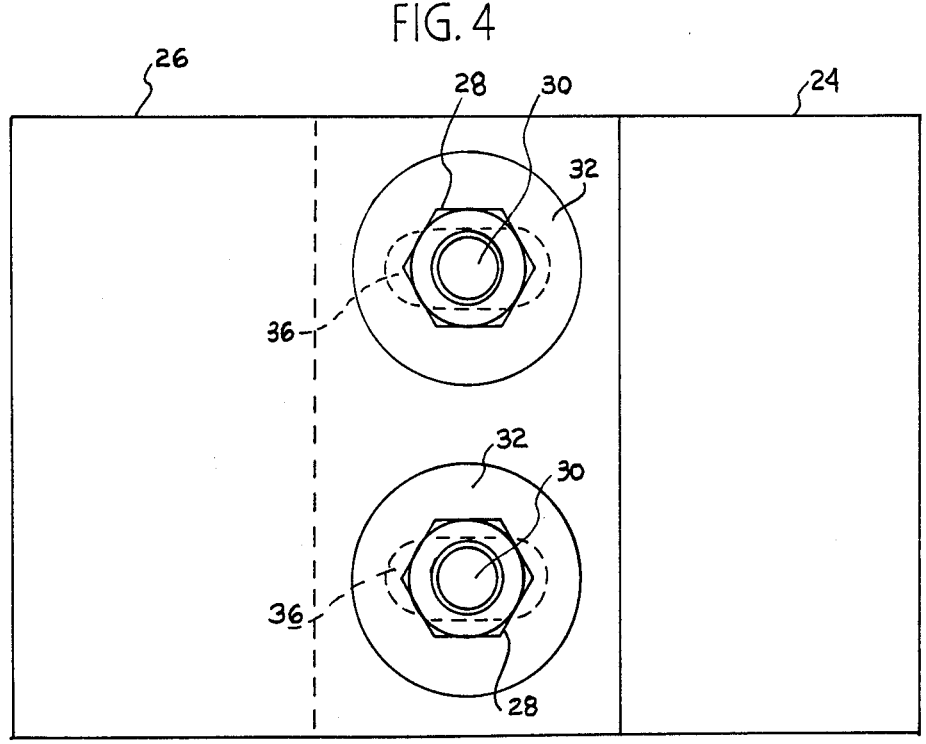
FIG. 4 is a top plan view of a modified form of the friction damper in FIG. 2.

Referring now to FIG. 4, the structure shown in FIG. 3 is modified by using wider plates 24 and 26 and using two bolts 30, positioned in side-by-side relation, together with corresponding nuts 28 and spring washers 32.

Figure 5:
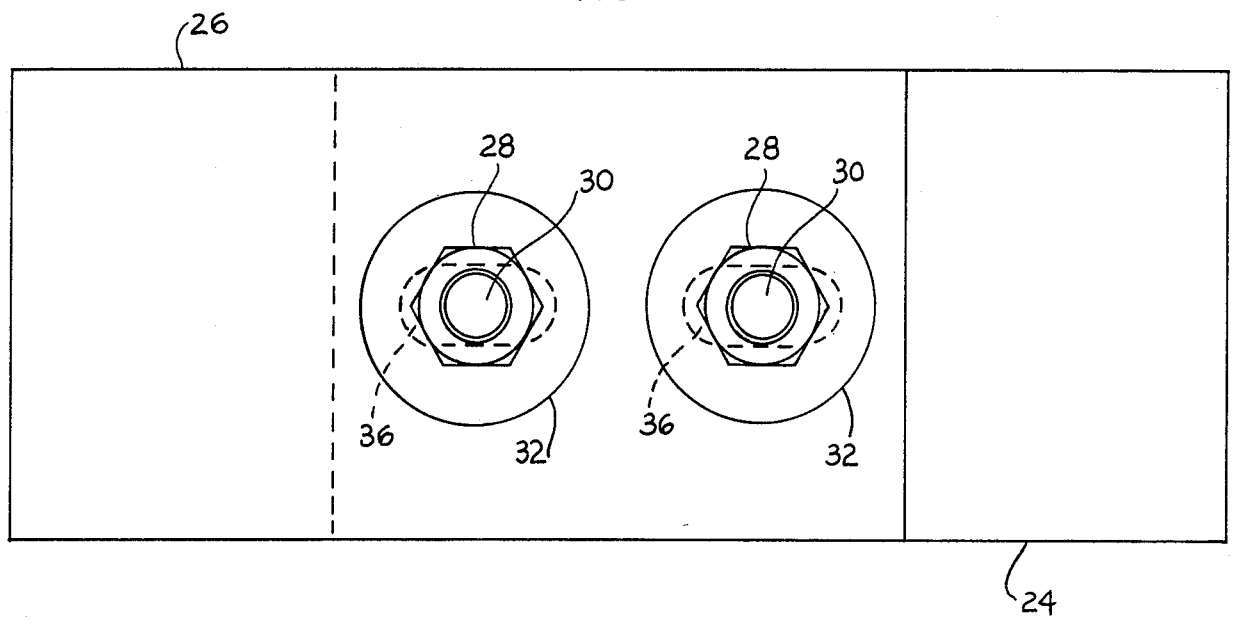
FIG. 5 is a top plan view of another modified form of the friction damper shown in FIG. 4.

FIG. 5 is similar to FIG. 4, except that the two bolts 30 are positioned longitudinally of the joist in connection with which the damper assembly is used, instead of transverse to the longitudinal axis of the joist as in the form shown in FIG. 4.

Figure 6:
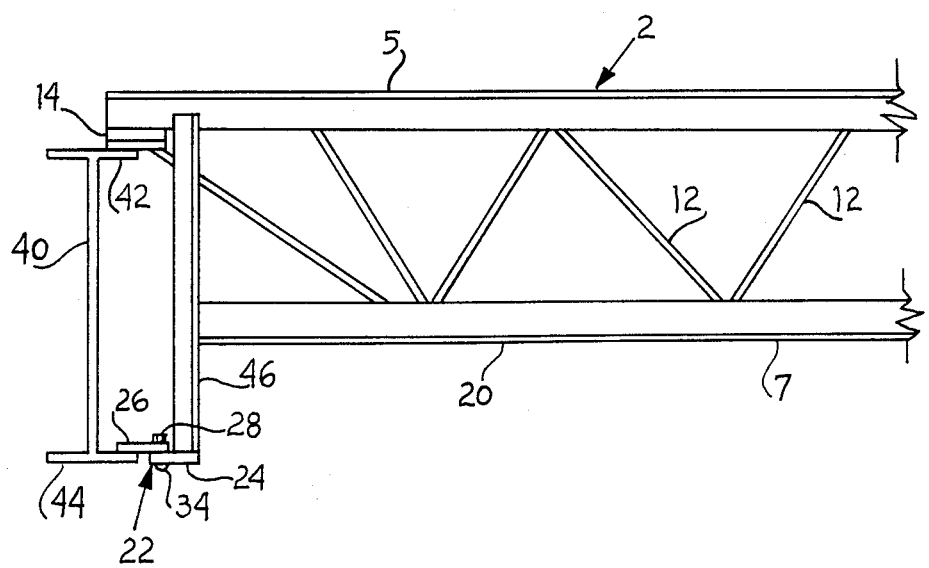
FIG. 6 is a fragmentary view of a joist supported on a structural beam, in which the friction damper is placed between the vertical lever arm and the flange of the structural beam.

Referring now to FIG. 6, the joist girder 2 has its T-clip 14 supported on the upper flange 42 of a structural beam 40. It is understood, of course, that all of the members described, except where otherwise indicated, are made of any suitable metal—preferably steel. A vertical lever arm 46 is welded to the upper chord 5 of the joist 2 and to the bottom chord extension 20 of the joist. To the bottom of this vertical lever arm, which extends adjacent the lower flange 44 of the structural beam 40, I weld the bottom plate 24 of my vibration damper. The plates 24 and 26 make metal-to-metal contact, the pressure of which is adjusted by means of the nut 28 as described hereinabove.

Figure 7:
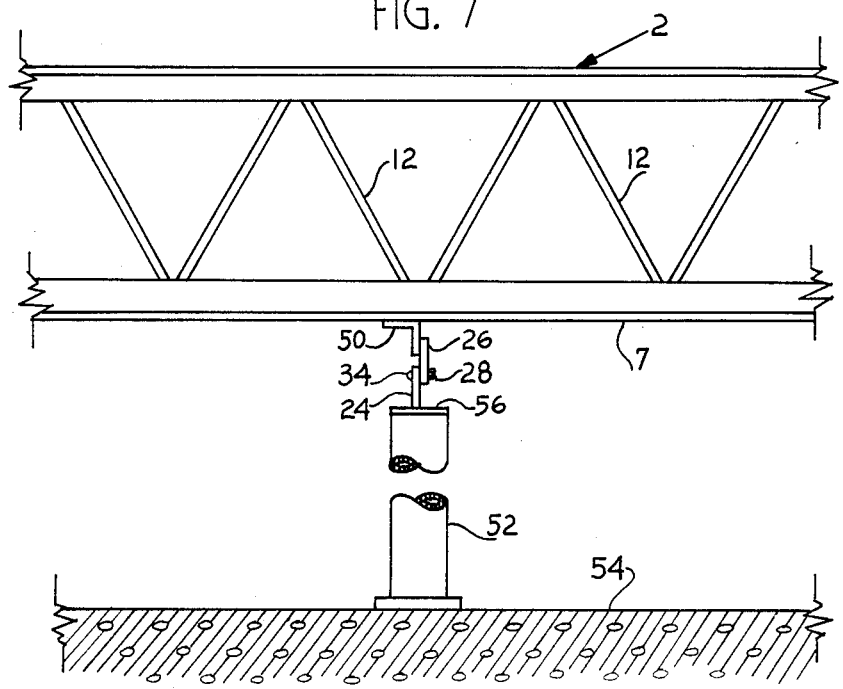
FIG. 7 is a fragmentary view showing the vibration damper of my invention extending between an intermediate portion of a joist supporting column.

In FIG. 7, I have shown a mid-portion of the joist girder 2. To the lower chord 7 of the mid-portion, I weld a clip 50, to which I secure the upper plate 26 of my vibration damper. A vertical column 52 is supported on a basement floor 54 or other support means. To the upper portion of the column 52, I secure a plate 56, to which I weld the lower plate 24 of my vibration damper.

Figure 8:
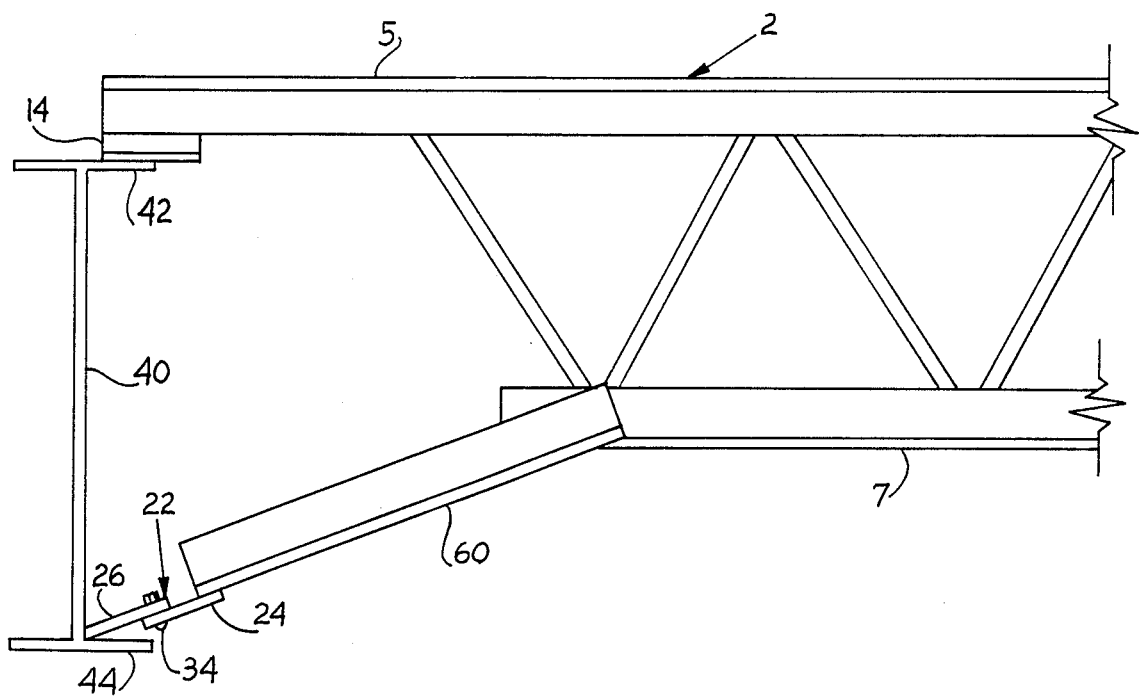
FIG. 8 is a view similar to FIG. 6, in which a diagonal strut extends from the joist to position the vibration damper between a horizontal girder and the bottom chord of the joist.

In FIG. 8, I have shown a modification of the assembly shown in FIG. 6. Instead of using a vertical lever arm 46 as shown in FIG. 6, I weld a diagnonal member 60 from the lower chord 7 of the joist 2. The member 60 extends adjacent the lower flange 44 of a structural beam 40, which may, if desired, be a joist girder. To the lower end of the diagonal member 60, I weld the lower plate 24 of my vibration damper 22. To the lower flange 44 of the structural member 40, I weld the upper plate 26 of my vibration damper 22. To the upper chord 5 of the joist 2, I weld a T-clip 14, which is welded to the upper flange 42 of the structural member 40.

It will be understood that the vibration damper, indicated generally by the reference numeral 22, may take any of the forms shown in FIGS. 2, 3, 4, and 5. Furthermore, vibration dampers may be positioned as shown in FIGS. 1, 6, and 8 at one end or both ends, or in the middle as shown in FIG. 7, or at both ends and the middle as well.

Borrowing a term from the electrical nomenclature, I may vary the Q of the damping. A low Q indicates rapid damping; a high circuit is one which oscillates for a long time. I am enabled to control the Q by varying the strength of the spring washer 32, by the amount of pressure exercised on the spring washer by the nut 28, and by the friction material 38 positioned between the plates of the vibration damper. I can control the Q by using one or a plurality of pressure-applying assemblies. Furthermore, I may control the Q by using vibration dampers at one end, at both ends, at one end and the middle, or at both ends and the middle of the joist.

It will be seen that I have accomplished the objects of my invention. I have provided a damping building structure in which the damping means is a simple, inexpensive, and efficient one for damping vibrations in girders and, more particularly, floor joists. My damping building structure prevents oscillations in a floor joist from being transmitted to the supports of the joist and causing damage to the entire building structure. My damping means is economical to produce and is effective through a wide range of sizes and spans of joists. The extent of damping can easily be controlled in a number of different ways.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A damping building structure including in combination a flexible girder, means for supporting said girder adjacent its ends, a first plate secured to a portion of said girder, a second plate secured to said supporting means in overlapping relation with said first plate, and spring means for frictionally clamping said plates together.

2. A damping building structure as in claim 1 in which said girder is a fabricated floor joist.

3. A damping building structure as in claim 1 in which said clamping means includes a nut and bolt.

4. A damping building structure as in claim 1 in which said clamping means includes a nut and threaded bolt and a spring interposed between one of said plates and said nut.

5. A damping building structure as in claim 1 in which said clamping means comprises a plurality of nuts and bolts.

6. A damping building structure as in claim 1 in which a first plate is secured to each end of said girder and a second plate is secured to said supporting means in overlapping relation with each of said first plates.

7. A damping building structure as in claim 1 in which said first plate is secured to said girder adjacent the mid-point of said girder and in which said supporting means includes a structural support adjacent said first plate.

8. A damping building structure as in claim 1 in which said girder is a joist and said girder portion carrying said first plate is a horizontal extension of the bottom chord of said joist.

9. A damping building structure as in claim 1 in which said girder is a joist and said girder portion carrying said first plate is a vertical extension of the bottom chord of said joist.

10. A damping building structure as in claim 1 in which said girder is a joist and said girder portion carrying said first plate is a diagonal extension of the bottom chord of said joist.

11. A damping building structure as in claim 1 in which a friction material is interposed between the overlapping portions of said first and second plates.

12. A damping building structure including in combination a pair of separated supports, a flexible joist spanning the separation between said supports and carried by said supports, a first plate secured to a portion of said joist, a second plate secured to said damping building structure in overlapping relation with said first plate, and spring means for frictionally clamping said plates together.

13. A damping building structure including in combination a flexible girder, means for supporting said girder, a first plate secured to said girder adjacent the mid-section of said girder, a vertical column positioned adjacent said first plate, means for supporting said column, a second plate positioned in overlapping relation with said first plate and carried by the upper portion of said column, and spring means for frictionally clamping said plates together.

* * * * *